United States Patent
McGrath

(10) Patent No.: US 10,062,099 B2
(45) Date of Patent: Aug. 28, 2018

(54) PRODUCT IDENTIFICATION BASED ON LOCATION ASSOCIATED WITH IMAGE OF PRODUCT

(71) Applicant: Aruba Networks, Inc., Sunnyvale, CA (US)

(72) Inventor: Scott McGrath, Boscawen, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1046 days.

(21) Appl. No.: 14/340,970

(22) Filed: Jul. 25, 2014

(65) Prior Publication Data
US 2016/0027091 A1    Jan. 28, 2016

(51) Int. Cl.
  *G06Q 30/06*   (2012.01)
  *G06K 9/00*   (2006.01)
  *G06K 9/62*   (2006.01)

(52) U.S. Cl.
  CPC ..... *G06Q 30/0633* (2013.01); *G06K 9/00771* (2013.01); *G06K 9/6201* (2013.01); *G06K 2209/27* (2013.01)

(58) Field of Classification Search
  CPC ........... G06Q 30/0259; G06Q 30/0261; G06Q 30/0639; H04N 5/2257; H04N 21/4223; G06F 17/30867
  USPC .................................. 705/14.57, 14.58, 26.9
  See application file for complete search history.

(56) References Cited

U.S. PATENT DOCUMENTS

| 8,810,599 B1* | 8/2014 | Tseng | G06T 7/0018 340/435 |
| 9,600,720 B1* | 3/2017 | Gray | G06K 9/6288 |
| 9,633,390 B2* | 4/2017 | Acker, Jr. | G06Q 30/0633 |
| 2011/0125735 A1* | 5/2011 | Petrou | G06F 17/30256 707/723 |
| 2012/0315884 A1* | 12/2012 | Forutanpour | H04W 4/026 455/414.2 |
| 2014/0214547 A1* | 7/2014 | Signorelli | G06Q 30/0267 705/14.64 |

(Continued)

OTHER PUBLICATIONS

Clover, Juli, "Apple in Talks with Retailers about Mobile Payments Service", available online at <http://www.macrumors.com/2014/05/29/apple-mobile-payments-service/>, May 29, 2014, 1 page.

(Continued)

*Primary Examiner* — Mila Airapetian
(74) *Attorney, Agent, or Firm* — Mannava & Kang, P.C.

(57) ABSTRACT

According to one embodiment of the invention, a system for creating a virtual shopping cart based on location information embedded in an image and the results of image recognition performed on the image is described. One embodiment of the system comprises an access point comprising a hardware processor wherein the system is configured to perform operations comprising: obtaining a first image, of a particular product, taken by a device operated by a user, identifying a first physical location of the device when the image was taken by the device, based on the first physical location, filtering a set of images corresponding to a plurality of products to obtain a first subset of images that are stored in association with the first physical location, and comparing the first image to the first subset of images to identify a product, from the plurality of products, that matches the particular product.

20 Claims, 8 Drawing Sheets

(56) References Cited

U.S. PATENT DOCUMENTS

| | | | | |
|---|---|---|---|---|
| 2014/0313334 A1* | 10/2014 | Slotky | ............... | H04N 5/23222 |
| | | | | 348/148 |
| 2015/0169597 A1* | 6/2015 | Edge | .................. | G06F 17/3087 |
| | | | | 707/751 |
| 2016/0026853 A1* | 1/2016 | Wexler | ................ | H04N 5/2257 |
| | | | | 382/103 |
| 2018/0025412 A1* | 1/2018 | Chaubard | .......... | G06Q 30/0639 |

OTHER PUBLICATIONS

Lavars, Nick, "iBeacons Installed at MLB Stadiums for a Better-Connected Fan Experience", available online at <http://www.gizmag.com/mlb-ibeacons-stadium-fan-experience/31422/>, Mar. 30, 2014, pp. 1-5.

Wikipedia, "iBeacon", available online at <http://en.wikipedia.org/wiki/IBeacon>, retrieved on May 30, 2014, pp. 1-7.

Apple, "Store Planograms", ifo Apple Store available online at <http://www.ifoapplestore.com/stores/planograms.html>, retrieved on May 30, 2014, pp. 1-8.

Lavars, Nick, "iBeacons Installed at MLB Stadiums for a Better-Connected Fan Experience", retrieved on May 30, 2014, p. 1.

* cited by examiner

PRODUCT IDENTIFICATION BASED ON LOCATION ASSOCIATED WITH IMAGE OF PRODUCT

FIELD

Embodiments of the present disclosure relate to the creation of a virtual shopping cart using location information included in a beacon and image recognition to improve the ability to purchase one or more items through an electronic device.

GENERAL BACKGROUND

In recent years, mobile electronic devices have become ubiquitous. Many of these mobile electronic devices include a camera and a wireless receiver. The wireless receiver may be capable of receiving transmissions associated, among others, one or more Wireless Local Area Networks (WLANs), Bluetooth®, Bluetooth® Low Energy, and/or radio frequency identification (RFID). Frequently, consumers are in a hurry while shopping and therefore either purchase the wrong item (e.g., not correct size or desired color) or forego the purchase altogether.

One solution presented requires users to scan a barcode with their mobile device, such as a phone or tablet. The barcode is then typically required to pair with an application on the mobile device specific to a retail store. However, many retail stores do not have specific applications providing the capability of determining an item based on a barcode and some items may not have a barcode that is easily accessible (e.g., jewelry often has barcode obscured either by display position or by display case).

In addition, a consumer may not have sufficient time to approach the item, find the barcode and take a picture of it. Often times, a consumer is rushed while in a store due to the schedule of others they are with or the desire to be elsewhere (e.g., watching a sports event instead of spending time in the souvenir shop).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
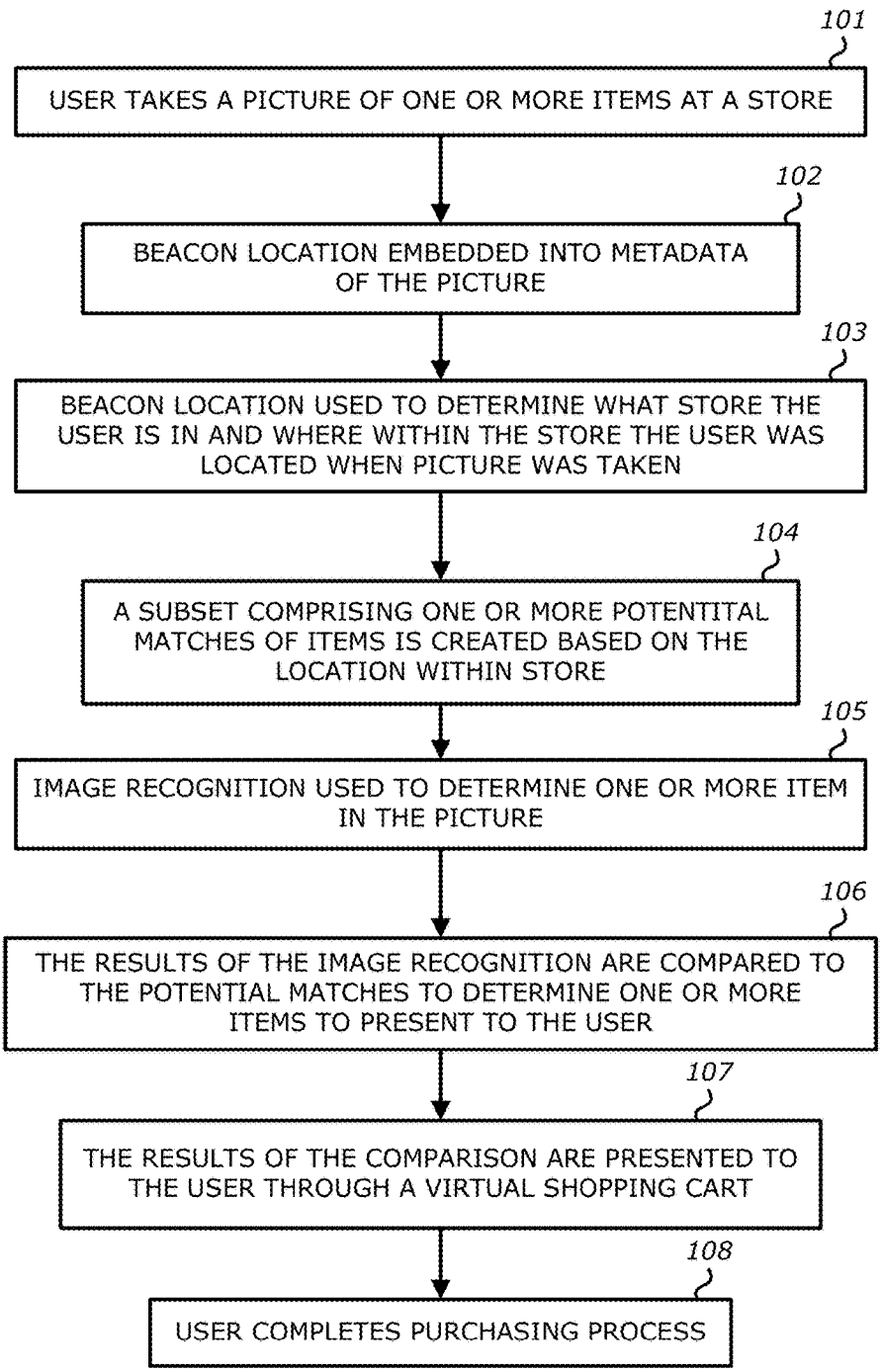
FIG. 1 is a flowchart illustrating an exemplary process for enabling a user to complete a purchasing process based on location information embedded in a picture and image recognition of one or more items in the picture.

Various embodiments of the disclosure relate to the creation of a virtual shopping cart through an analysis of location information embedded in an image file and results of an application of image recognition. In one embodiment, the location information is obtained through receipt of a beacon including the location information. The analysis includes using the location information to determine a location of where the image file was taken, and more specifically a particular location within a store. The analysis also includes using the location information to determine a subset of the items sold in the store based on an analysis of the store's item layout (e.g., a planogram). Furthermore, the image recognition is used to analyze the image file to determine the one or more items captured in the image file. The results of the image recognition are used to compare the one or more items in the picture to a subset of the items sold in the store.

Subsequently, a virtual shopping cart is created based on the results of the analysis of the image recognition and comparison to the subset of the items sold in the store. The virtual shopping cart is then presented to the user so the user may confirm that the one or more items placed in the virtual shopping cart were intended to be placed in the virtual shopping cart prior to completing the purchasing process.

I. Terminology

Herein, certain terminology is used to describe features within embodiments of the invention. For example, the term "network device" generally refers to electronic equipment which may be configured with an antenna system that enables transmission and/or receipt of wireless messages over a wireless network. Hence, the network device is further adapted with circuitry to support wireless connectivity with other network devices being part of the wireless network. Different types of network devices may include, but are not limited to (1) a client device and (2) an edge device.

Herein, the term "client device" may refer to a stationary network device (e.g., desktop computer, television, set-top box, video gaming console, etc.) or a mobile network device capable of connecting to one or more wireless networks. Illustrative examples of mobile network devices may include, among others, a tablet, laptop, netbook, bar-code scanner, a digital camera, and/or a mobile handset such as a smartphone or a personal digital assistant "PDA." Likewise, the term "access point" or "AP" is a network device, a type of edge device in particular, that controls access to a network, where the AP may be deployed as a wired access point that featured wired connectivity with one or more client devices or as a wireless access point that featured wireless connectivity with one or more client devices. Of course, the AP also may represent other types of edge devices such as a wireless base station, a cellular base station, or any device configured as a hot spot or gateway for network connectivity.

It is contemplated that a network device includes hardware logic such as one or more of the following: (i) processing circuitry (e.g., a hardware processor); (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals). Throughout the specification and claims, the terms "software module" and "software application" are used interchangeably.

The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

The term "beacon" refers to data transmitted by a transmitter and received by any client device within range of the transmitter. A beacon may be a management frame that allows the transmitter to notify any client devices within range of the transmitter that the transmitter is operating. For example, the beacon may indicate to one or more client devices that it would be advantageous to the client device to associate itself with the transmitter based on one or more statistics associated with the beacon. Examples of such statistics include, but are not limited or restricted to a received signal strength indicator (RSSI) associated with the beacon, a timestamp, a service set identifier (SSID) of the WLAN, transmission rates of the WLAN and/or requirements necessary to connect to the WLAN on which the beacon was transmitted. A beacon may be transmitted at predefined intervals and act as a "heartbeat" such that the beacon indicates to any client devices within reception range that the device transmitting the beacon is operational. In addition, a beacon may include a frame header and/or a portion containing a cyclic redundancy check (CRC). Throughout the specification and claims, the terms "beacon" and "beacon frame" are used interchangeably.

The term "location information" should be construed as any information from which a location may be determined or approximated. Location information may include Global Positioning System (GPS) coordinates, a transmission from one or more wireless transmitters from which the location of the wireless transmitter is known or may be determined, or a transmission from one or more wireless transmitters that explicitly recites a location or approximate location of the transmitter or of the receiving device. Examples of types of signals that may be transmitted by a wireless transmitter may include, but are not limited or restricted to, cellular transmissions (e.g., a transmission on a Wireless Local Area Network (WLAN) from either an AP and/or a controller), a radio wave transmission (e.g., a Bluetooth® transmitter, a Bluetooth® Low Energy transmitter, and/or a radio frequency identification (RFID) transmitter), an infrared (IR) transmission, or any other similar transmitter. In addition, location information may include network information enabling a client device to determine a location of the transmitter or the receiving device based on triangulation. Furthermore, location information may include data enabling a client device to use inertial navigation to determine a location of the client device. This data may include data from motion sensors such as accelerometers or rotation sensors such as gyroscopes.

The term "virtual shopping cart" should be construed as a piece of software on a web server related to shopping online. A virtual shopping cart allows a visitor to an Internet site to select and accumulate items for purchase. When items are selected (e.g., "added to the cart"), the customer typically may review the items and determine whether to finalize the purchase (e.g., "checkout") of these selected items.

The term "planogram" should be construed as a representation of the placement of items within a store. The representation may be visual, comprising one or more pictures, drawings, box diagrams, etc. Alternatively, the representation may be a database, spreadsheet or text file detailing the placement of the items within the store. Furthermore, a planogram may comprise a visual representation in combination with a text-based representation.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Location Information Provided by a Beacon and Image Recognition

A consumer at a store may not have sufficient time to determine the identity of the exact item the consumer notices and may desire to purchase. For example, a spectator at a baseball park may be passing a souvenir shop located at the ballpark and see an item in which is he interested. However, given that the spectator is carrying food and heading back to his seat to watch the remainder of the game, the spectator may not want to carry around the item. Furthermore, the spectator may not have the opportunity to walk over to the item and determine its identity (e.g., writing down the name or scanning a barcode) due to others in his group walking back to their seats or the accompaniment of children pulling him in a different direction. Therefore, it may be desirable to have the ability to simply take a picture of the item with a client device, for example a mobile telephone, and have the item added to a virtual shopping cart for the consumer's review at a later time.

For example, the consumer may simply take a picture of the item and, based on the consumer's location within the store or its surrounding location and/or image recognition of the item, the consumer may be presented with a virtual shopping cart having the item automatically populated in the virtual shopping cart. Therefore, when the consumer has the opportunity to review the virtual shopping cart, he may complete the purchase if he still desires to do so at that time.

Referring to FIG. 1, a flowchart illustrating an exemplary process for enabling a user to complete a purchasing process based on location information embedded in a picture and the results of image recognition performed on one or more items in the picture is shown. The process illustrated in FIG. 1 begins with a consumer (i.e., a user) at a store, amusement park, sports arena or the like. In block 101, the user takes a picture of one or more items for sale with a client device capable of receiving a beacon. Examples of the client device include, but are not limited or restricted to, a mobile telephone or a tablet. The client device includes the ability to receive a beacon such as a beacon frame transmitted by an AP or a broadcast signal transmitted by a Bluetooth® (or Bluetooth® Low Energy) transmitter. Alternatively, the beacon may be a broadcast signal from a radio frequency identification (RFID) transmitter or an infrared (IR) transmitter, provided the client device has the capability to receive and process a transmission based on the technology. The beacon provides information to the client device pertaining to the surroundings of the client device. In particular, the beacon provides location information to the client device.

In block 102, the location information provided by the beacon is embedded into the metadata of the picture (this may also be referred to as "geotagging"). The metadata may include, for example, data stored in the format specified by the Exchangeable image file format (Exif) standard. The Exif standard includes a specification of formatting information such as date and time information, camera information (e.g., aperture, shutter speed, whether the flash was on or off), picture descriptions, copyright information and location information. Typically, the Exif data is embedded within the picture. Alternatively, the metadata may include data stored in the format specified by the Extensible Metadata Platform (XMP) format. Embedding data into a file may be construed as including the data into one or more portions of the image file, for example, in the header. The data may be included as a predefined field within the header, or a field may be altered or created to incorporate the data.

In yet another embodiment, the application creating the virtual shopping cart may parse data in an image file embedded in the International Press Telecommunications Council (IPTC) standard format. The IPTC standard gives users freedom in defining fields included in the data to be embedded in the image file. For example, users may include keywords, descriptions relating to the picture, the location of the picture, the photographer's name, etc.

In block 103, the location information is used to determine in what store and where within the store the picture was taken. The action of block 103 may occur immediately following the time at which the picture was taken or at a later time such as a time after the user has left the store.

In block 104, a subset of the items for purchase in the store is created based on the user's location within the store when the picture was taken. The subset comprises one or more potential matches of the one or more items included in the picture (the subset will be referred to as "the potential matches"). The subset comprises those items located within a predefined proximity to the location of the user in the store when the picture was taken. The predefined proximity may be configurable by, for example, an administrator deploying the transmitting device or by the user via or one or more options in a settings menu of the software application.

In block 105, image recognition technology is used to determine the one or more items included in the picture. The results of the image recognition may provide, among others, one or more results for a single item in the picture, or if more than one item was included in the picture, one or more results for the more than one items. In block 106, the results of the image recognition are compared to the potential matches to determine which items to present to the user.

In block 107, the one or more matching items are presented to the user through a virtual shopping cart. In block 108, the user may complete a purchasing process by verifying the one or more items presented in the virtual shopping cart were the intended one or more items to be included in the picture. The user may also specify one or more characteristics about the purchase such as, among others, quantity, color, size and/or delivery options (e.g., store pick-up, warehouse pick-up, and/or home or office delivery).

A. Information Location Provided by a Beacon

A beacon may be transmitted by a transmitter and received by a client device while the client device is in a store. One example of a transmitter may be an AP. The one or more APs may be located within a store and based on the location of the consumer within the store, the client device may receive beacon frames from one or more APs. The beacon frames may include, among other information, location information of the transmitting AP. The client device may use the location information included in the beacon frames to determine the client device's location within the store or within surrounding areas. For example, the client device may determine that the client device is within a given radius from the position of the AP.

The client device is not required to be connected to a wireless communications network. For example, a beacon frame is transmitted by an AP and received by all client devices within range of the AP regardless of whether the client device is connected to the wireless communications network on which the transmitting AP is operating. In addition, other types of transmissions, such as radio wave transmissions (e.g., Bluetooth®, Bluetooth® Low Energy, or RFID) or infrared transmissions for example, do not require a connection to any wired or wireless communication network either.

Transmitters using Bluetooth® or Bluetooth® Low Energy may take advantage of profiles defined within standards for such technology. For example, a proximity profile is defined for Bluetooth® Low Energy such that a proximity monitor (e.g., a transmitter) is able to detect when the proximity monitor is within a predefined range of a proximity reporter (e.g., a client device). In particular, the proximity monitor may use the received signal strength indicator (RSSI) value of a received radio signal to determine the distance to the proximity reporter.

Figure 2:
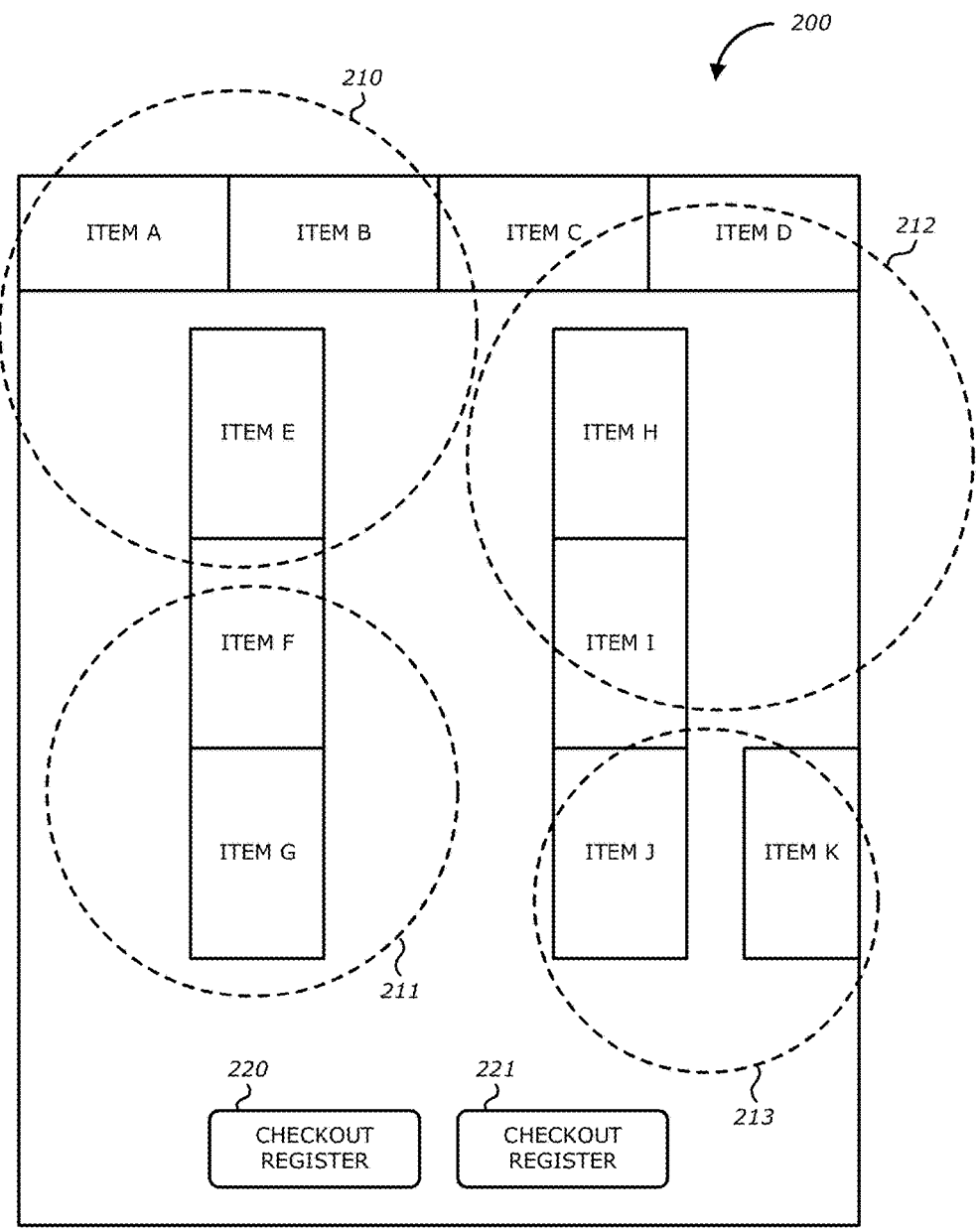
FIG. 2 is an exemplary block diagram illustrating a store layout including items located within one or more ranges of APs located within the store.

Referring to FIG. 2, an exemplary block diagram illustrating a store layout including items located within one or more ranges of APs located within the store is shown. The store 200 includes the items A-K, the AP ranges 210-213 and the checkout registers 220 and 221. The items A, B, C, E and F are included within the AP range 210. The items F and G are included within the AP range 211. The items C, D, H and I are included within the AP range 212 and the items I, J and K are included in the AP range 213. Each of the AP ranges 210-213 correspond to a separate AP (not shown).

When a consumer walks into the store 200 and approaches an item, the client device carried by the consumer may receive a beacon frame from one or more of the APs located within the store. For example, if a consumer approaches item K within the store 200, the client device of the consumer may receive a beacon frame when the consumer enters the AP range 213. The beacon frame may include, among other information, the location information of the transmitting AP. From the location information of the AP, the client device of the consumer may determine its approximate location within the store 200. In addition, as the consumer moves away from item K and approaches item D, the consumer will leave the AP range 213 and enter the AP range 212. In this situation, the client device of the consumer will stop receiving the beacon frame transmitted by the AP corresponding to the AP range 213 and will instead receive the beacon frame transmitted by the AP corresponding to the AP range 212. Based on the new beacon frame, the client device of the consumer will be able to update its approximate location within the store 200.

When a consumer approaches an item he likes and is considering purchasing, the consumer merely needs to take a picture of the item in order for the item to be identified and automatically placed in a virtual shopping cart if the client device receives a transmission including the location information. For example, still referring to FIG. 2, if a consumer is within the AP range 213 and takes a picture of item K, a virtual shopping cart may be created automatically for the consumer based on the location information included in the beacon frame transmitted by the AP corresponding to the AP range 213 and the results of image recognition (to be discussed below) applied to the picture.

When a consumer takes a picture of an item in a store but is not within any AP range and therefore not receiving a beacon allowing the consumer's client device to determine the location at which the picture was taken, previously received beacons may be used by the client device. In one embodiment, the client device may use location information of the most recently received beacon. For example, a consumer may walk out of range of any of the APs, turn around and take a picture of the item. Therefore, in this situation, the client device may use the location information included in the most recently received beacon. If the consumer did not venture far enough into the store to come within range of an AP, the client device may use the latest GPS coordinates received prior to taking the picture to determine in which store the picture was taken. In this case, a location within the store may not be obtainable.

In one embodiment, the creation of the virtual shopping cart may be done immediately following the time at which the picture was taken allowing the consumer to complete the purchasing process prior to leaving the store. Alternatively, the creation of the virtual shopping cart may be done at a later predetermined time (e.g., one hour after the picture is taken). In yet another embodiment, the creation of the virtual shopping cart may not take place until the consumer initiates the process at a later time. The process of creating a virtual shopping cart may be performed via software loaded onto the client device (e.g., a software application) or via software loaded on a computer at an external location (e.g., on a cloud server).

As discussed above, the AP ranges referenced in, among others, FIG. 2, may also be ranges of other technologies, examples of which include, but are not limited or restricted to, Bluetooth®, Bluetooth® Low Energy, RFID and/or infrared.

Figure 3A:
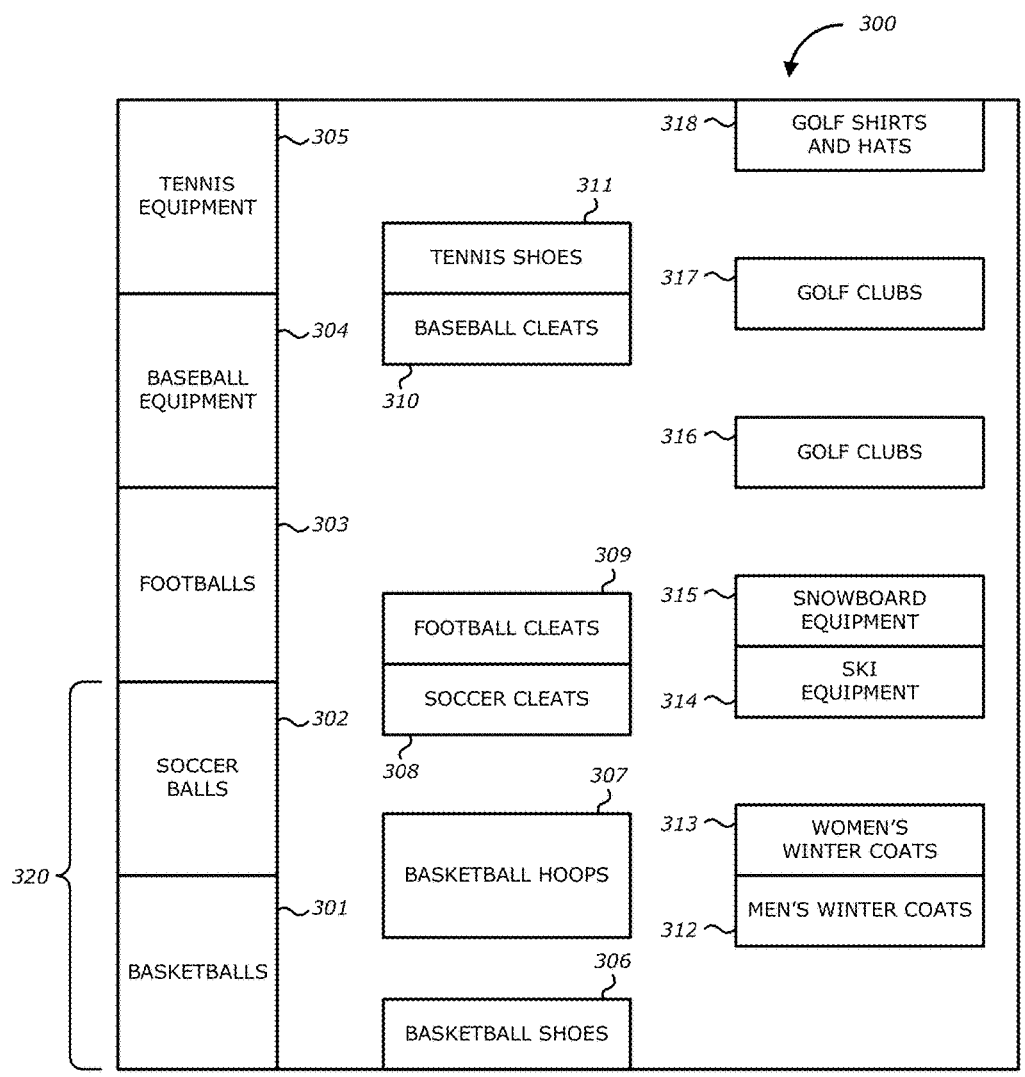
FIG. 3A is an exemplary block diagram of a planogram of a store.

The creation of a virtual shopping cart based on the location information of where the picture was taken and the results of image recognition performed on the picture is typically dependent on the analysis of a planogram of the store. Referring to FIG. 3A, an exemplary block diagram of a planogram of a store is shown. The planogram 300 comprises a box diagram illustrating the layout of items 301-318. The planogram 300 visually depicts the physical layout of the items to be sold in the store. Planogram 300 includes shelving unit 320.

Figure 3B:
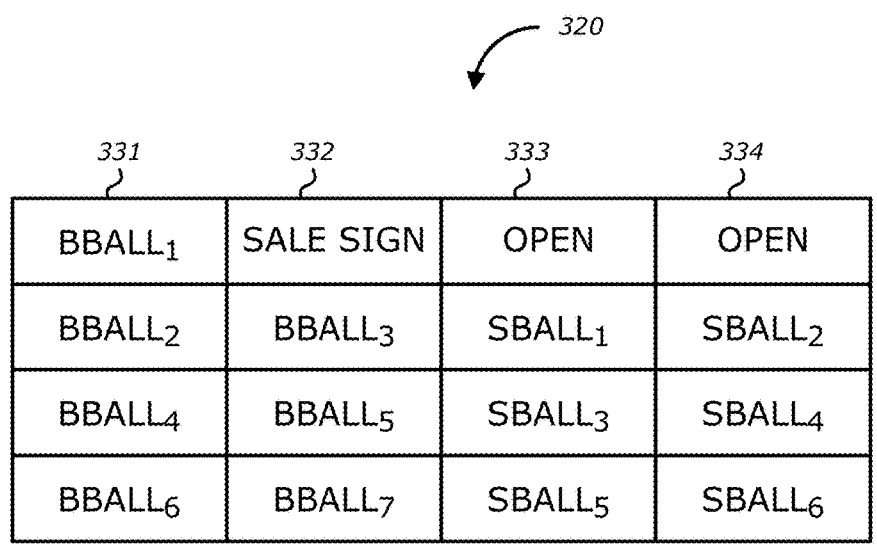
FIG. 3B is an exemplary box diagram of the shelving unit of FIG. 3A.

Referring to FIG. 3B, an exemplary box diagram of the shelving unit of FIG. 3A is shown. FIG. 3B illustrates a portion of the planogram 300 of FIG. 3A in greater detail such that the ordering of specific items on a shelving unit are illustrated. The shelving unit 320 includes columns 331-334. FIG. 3B defines the location of at least some of the different basketballs (Bball$_1$-Bball$_7$) and soccer balls (Sball$_1$-Sball$_6$) the store 200 has for sale. FIG. 3B also illustrates that a planogram may even define the location of a sign, such an advertisement, or that a portion of a shelving unit does not contain an item (e.g., represented by "open" in FIG. 3B).

Figure 3C:
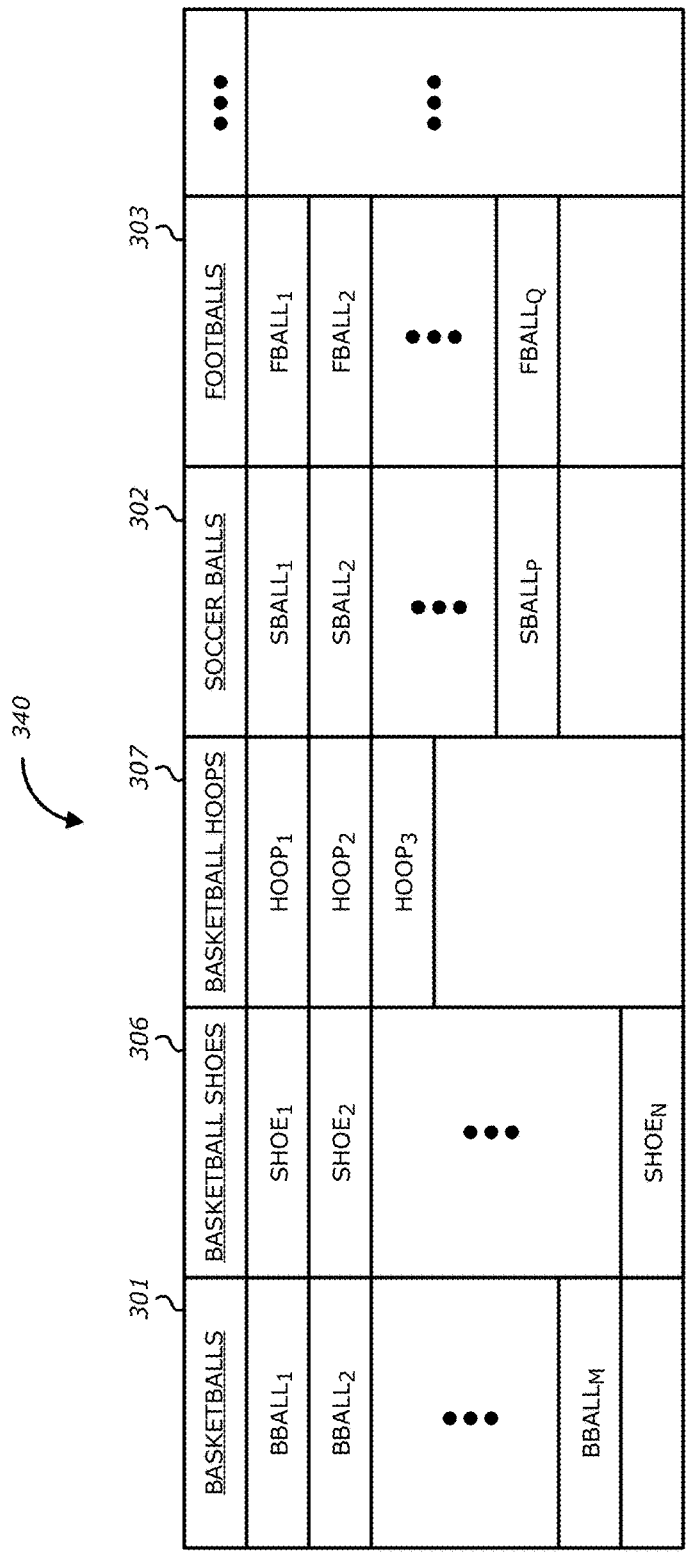
FIG. 3C is an exemplary spreadsheet accompanying the planogram of FIGS. 3A and B.

Referring to FIG. 3C, an exemplary spreadsheet accompanying the planogram of FIGS. 3A and B is shown. The spreadsheet 340 includes the columns 301, 306, 307, 302 and 303 as shown, as well as other columns that may appear off to the right of the page. Each of the columns 301, 306, 307, 302 and 303 provides detail to the planogram 300 of FIG. 3A by listing each item, by category, the store has for sale. For example, the column 301 represents the different basketballs the store has for sale. The process of creating a user's virtual shopping cart may use the location information from a received beacon to determine the probability that the picture was taken of one or more basketballs and limit the comparison of the result of the image recognition to the items listed in the column 301.

In particular, the process of creating a virtual shopping cart is made more efficient if the process only needs to consider a subset of items to compare to the one or more items in the picture as opposed to considering all of the items the store has for sale. In this sense, the location information can be used to filter the items to compare to the results of the image recognition.

Figure 4:
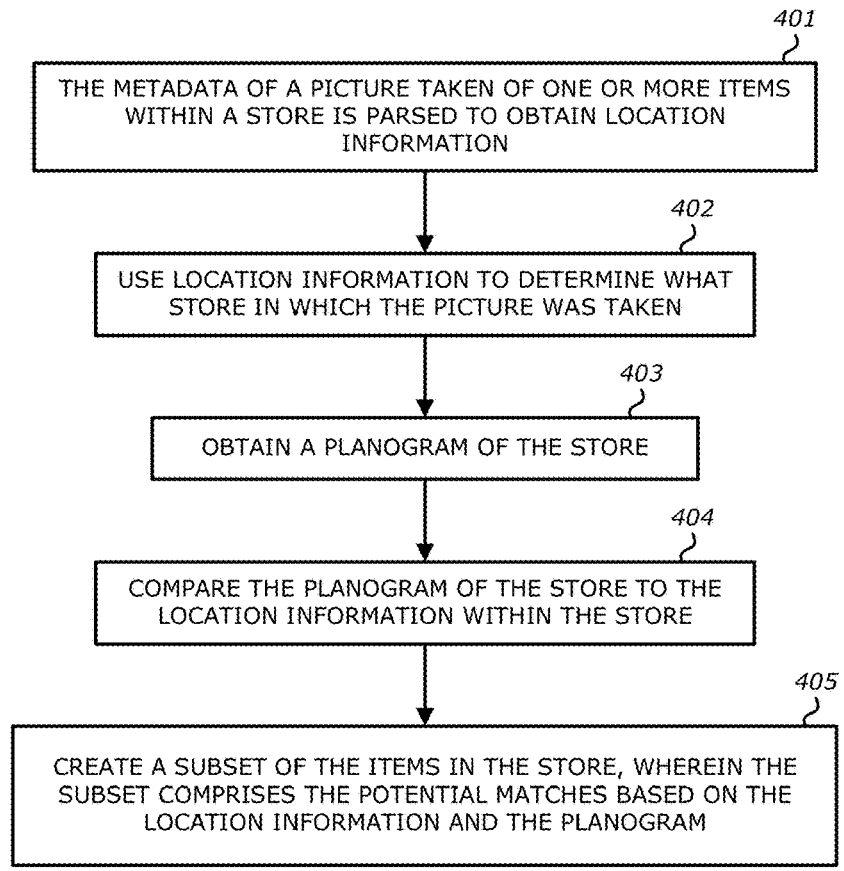
FIG. 4 is a flowchart illustrating an exemplary process for determining a subset of all items a store has for sale to compare to the results of image recognition based on the location information of a received beacon.

Referring to FIG. 4, a flowchart illustrating an exemplary process for determining a subset of all items a store has for sale to compare to the results of image recognition based on the location information of a received beacon is shown. In block 401, the metadata of a picture taken of one or more items within a store is parsed to obtain the location information. As discussed previously, the location information may be derived from a beacon frame transmitted by an AP within the store. The location information may then be embedded into the picture.

In one embodiment, the location information may represent the location of the transmitting AP. In such an embodiment, the client device may create a subset of items within the store by defining a range using a predefined radius extending outward from the location of the AP. For example, if the predefined radius length is 10 feet, the client device was create a circular range around the AP having a radius of 10 feet. Therefore, when applying the range to the planogram of the store, the application software creating the virtual shopping cart would include in the subset all items within the range of the AP. This embodiment would not require the client device to know the range of the AP transmitting the beacon frame.

In block 402, the location information may be used to determine in which store the picture was taken. For example, the location information may include GPS coordinates of the transmitting device such that the store in which the transmitting AP is located may be determined. Furthermore, the location information may explicitly state the store in which the transmitting AP is located. Alternatively, the location information may include a unique identifier of the store in which the transmitting AP was located, wherein the unique identifier enables the determination of the store's location. In block 403, once the store has been determined, the planogram of the store is obtained. A planogram of a store may be obtained through querying a database of planograms for example. Alternatively, the software application or software performing the process for determining the potential matches may search the Internet to obtain the planogram of the store if no database was previously compiled or the store's planogram was not previous input into the database.

In block 404, the planogram of the store is compared to the location information within the store. This comparison allows for a more efficient analysis of the planogram, any spreadsheets accompanying the planogram and the results of the image recognition by limiting the number of items to be analyzed. In block 405, a subset of all of the items located in the store is created based on the location information within the store. The subset comprises potential matches of the one or more items included in the picture.

For example, referring to FIG. 2, if a consumer approaches Item G and the client device of a consumer receives a beacon from the AP corresponding to the AP range 211, the location information included in the beacon may limit the potential matches to Items G and F as those are the two items included in the AP range 211. Therefore, once the store 200 has been determined as the store in which the picture was taken and a planogram of the store 200 has been obtained, the location information within the store 200 may limit the potential matches based on items included within an AP range. Alternatively, items from one or more AP ranges may be included in the potential matches. For example, all items in any AP ranges adjacent to the AP range in which the client device received the beacon may be included in the potential matches.

In the embodiment in which the consumer did not venture far enough into the store to come within range of an AP, the client device may use most recent GPS coordinates to determine in which store the picture was taken but may not be able to determine the potential matches as no location within the store is known. Therefore, all items will be compared to the results of the image recognition. Alternatively, the client device may determine in which store the picture was taken and use one or more AP ranges closest to the entrance of the store as the location at which the picture was taken.

Furthermore, as seen in FIG. 2, a portion of the range of one or more APs may extend outside of the store's physical boundaries. For example, the AP ranges 210, 212 and 213 extend beyond the physical boundaries of the store 200. This may allow a consumer to stand outside of the store and complete the purchasing process. For example, a consumer may come within the AP range 210 and receive a beacon transmitted by the AP associated with the AP range 210 while standing outside of the store 200. In such an example, if the customer takes a picture of Item A with a client device, the location information included within the beacon would be embedded in the picture. The location information would provide the receiving client device with the information to determine that the customer is standing outside of the store 200, obtain a planogram of the store 200 and obtain the potential matches. This example is intended to illustrate that a customer does not have to physically enter a store in order to receive a beacon being transmitted from a transmitter within the store in order to complete the purchasing process described herein.

In another embodiment, a customer may be standing at a kiosk which does not contain an interior location into which a customer may enter. Therefore, the customer may come within range of a transmitter of the kiosk, receive a beacon and complete the purchasing process after taking a picture of one or more items at the kiosk. In yet another embodiment, the kiosk may not include a transmitter but the client device of the customer may receive other location information, such as GPS coordinates, from which the client application software creating the virtual shopping cart may determine the identity of the kiosk. The application software may then obtain one or more planograms of the kiosk and proceed with the process of creating the virtual shopping cart.

B. Image Recognition

Image recognition refers to the analysis of an image in order to make a determination as to the contents of the image. Image recognition is aimed at enabling a computer to perceive the image as a human would and potentially make decisions based on the perception of the image. For example, a software application may apply one or more image recognition techniques to a picture taken by a consumer to determine what items are included in the picture.

There are several techniques, methods or approaches for image recognition. Examples of image recognition approaches include, but are not limited or restricted to, providing image templates based on a set of pre-specified or learned objects, edge detection (e.g., Canny edge detection), corner detection, geometric hashing, scale-invariant feature transformation (SIFT), speeded up robust features (SURF) and/or artificial neural networks (ANNs). In addition, several image recognition application programming interfaces (APIs) are available. One or more of image recognition APIs may be used in building a software application that performs image recognition in order to create a virtual shopping cart for a consumer.

Figure 5:
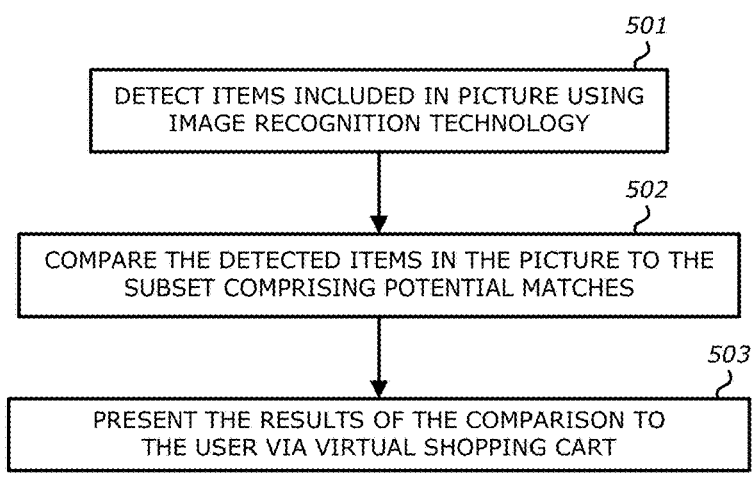
FIG. 5 is a flowchart illustrating an exemplary process for detecting items to present to the user from the potential matches using image recognition.

Referring to FIG. 5, a flowchart illustrating an exemplary process for detecting items to present to the user from the potential matches using image recognition is shown. As discussed above, a consumer may want to identify an item within a store to consider purchasing at a later time but only have time to take a picture of the item in the store with a client device, e.g., a mobile telephone. In block 501, one or more items included in the picture are detected based on the application of one or more image recognition techniques to the picture. The results of the image recognition are then compared to the potential matches as discussed in accordance with FIG. 4 (block 502).

In block 503, the items to present to the user determined from the comparison in block 502 are presented to the user through a virtual shopping cart. In an embodiment in which the picture taken by the consumer only includes one item, the comparison of block 502 may result in a single "matched item" for the item in the picture. The single match may be the item having the highest match probability of the items comprising the potential matches as discussed in accordance with FIG. 4. Alternatively, the single matched item may be a result of only one item of the potential matches satisfying a probability threshold. In this embodiment, an item of the potential matches will be considered a matched item if the probability based on the comparison of the potential matches and the results of the image recognition exceed a predetermined threshold.

In a similar embodiment, multiple items may satisfy the probability threshold. In such an instance, multiple matched items will be presented to the user so the user may determine which of the matched items, if any, is the intended item. In another embodiment, multiple items may be detected in the picture taken by the consumer. In this case, the one or more matched items may be presented for the user to determine which was the intended item or if more than one items were intended. Alternatively, if two or more items were included in the picture, the center-most item may be presented to the consumer as most-likely to be the intended item.

In any embodiment in which multiple items are presented to the user, the order in which the items are presented may be determined by the probability the item was intended to be placed in the virtual shopping cart, randomly presenting the items satisfying a probability threshold, one or more characteristics of the items, or one or more merchant defined parameters. For example, the application creating the virtual shopping cart may look to the price of each of the items satisfying the probability threshold and present the items in order of highest to lowest price, or alternatively, lowest to highest price.

In another embodiment, the merchant may define parameters to be followed by the application. For example, the merchant may desire that the highest priced item satisfying the probability threshold be presented first (or at the top of the page). Alternatively, the merchant may desire that the best-selling item be presented first (or at the top of the page). The "best selling item" may be defined as an item that has been sold more than any other item within the group of items satisfying the probability threshold over a predefined time period. Alternatively, the merchant may desire that the item having the most units in stock of any item in the group of items satisfying a probability threshold be presented first (or at the top of the page). Examples of other parameters may include, but are not limited or restricted to, the most profitable item presented first (or at the top of the page) or an on-sale item (e.g., seasonal item) presented first (or at the top of the page).

III. Checkout Using the Virtual Shopping Cart

Once an image recognition approach has been applied to the picture taken by a consumer and the one or more items in the picture have been identified, the results of the image recognition are presented to the consumer. The consumer may then complete the purchasing process by verifying that the one or more items identified during the image recognition are the intended one or more items. For example, a single item may have been included in the picture and a single match may have been detected by the software. In this instance, the one match would be presented to the consumer to either, among others: purchase; verify and then purchase; remove from that virtual shopping cart (e.g., if the consumer changed his mind); or indicate that the match was not the intended item.

Figure 6:
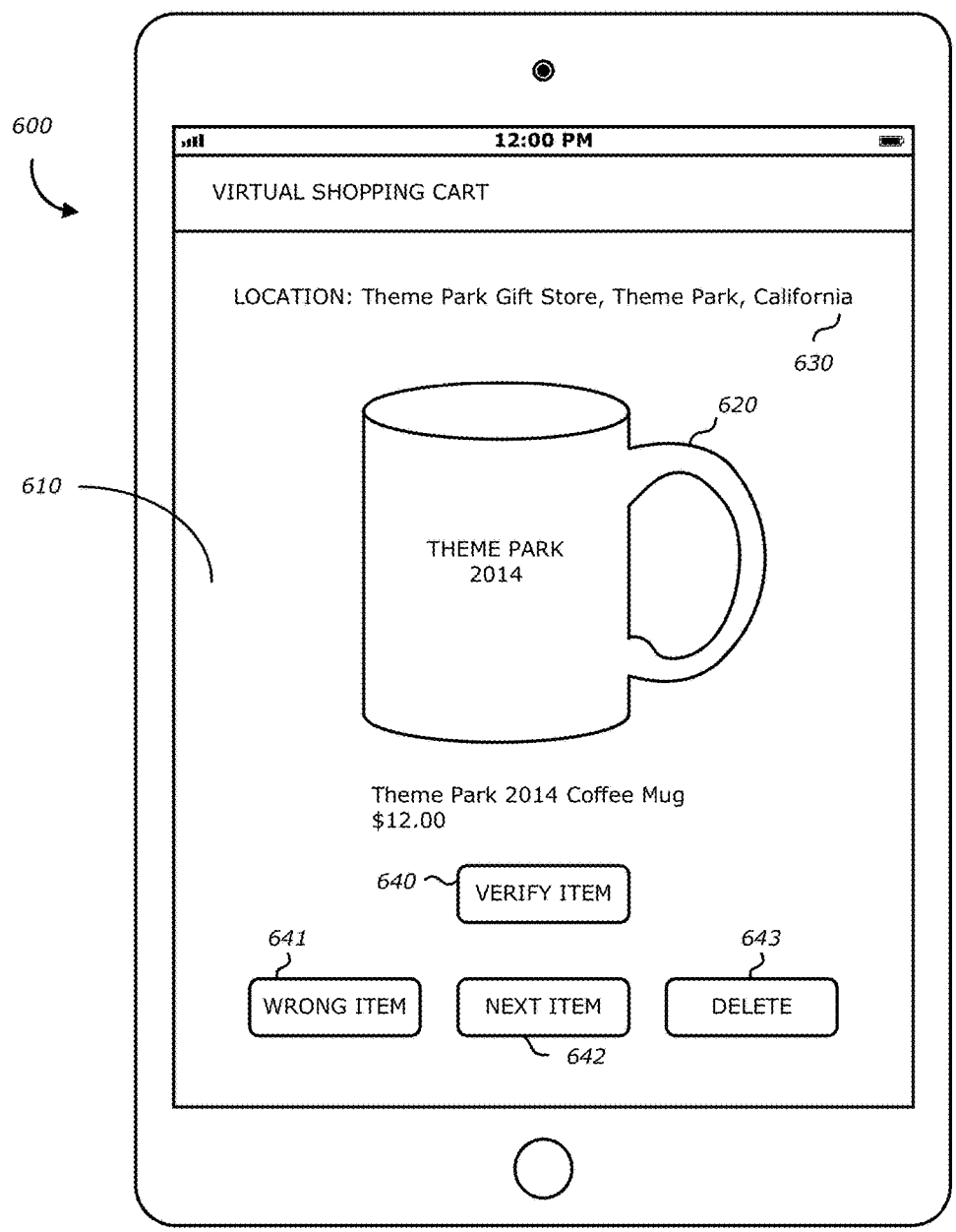
FIG. 6 is an exemplary illustration of a network device adapted to present a virtual shopping cart to a user.

Referring to FIG. 6, an exemplary illustration of a network device adapted to present a virtual shopping cart to a user is shown. The network device 600 includes a screen 610. The screen 610 is shown displaying a virtual shopping cart to a user. The display of the virtual shopping cart includes the matched item 620, the location 630 of the store in which the picture was taken, the "verify item" button 640, the "wrong item" button 641, the "next item" button 642 and the "delete" button 643.

In the embodiment illustrated in FIG. 6, the matched item 620 is the only "matched" item presented to the user. This may indicate that the matched item 620 was the only item that satisfied a threshold probability of being a match with the item detected in the picture or, alternatively, that the matched item 620 was the item with the highest probability of being the item intended by the consumer.

The location information 630 indicates in what store the picture was taken. This may be useful to a consumer if the consumer has taken a picture of the same item in a plurality of stores and wants to compare the price of the item at each store. In addition, the location of the store may affect the decision the consumer makes regarding the delivery or pick-up options.

The "verify item" button 640 enables the user to indicate that the matched item 620 is indeed the intended item and continue with the purchasing process (e.g., fill in billing and shipping information on a subsequent display). The "wrong item" button 641 allows the user to indicate that the matched item 620 is not the intended item and that he does not wish to proceed with the purchasing process for this item. If the user selects the "wrong item" button 641, the software application presenting the virtual shopping cart to the user may present the matched item with the next highest probability, if applicable. Alternatively, if no other items were found to match (e.g., no other items within the potential matches satisfied a threshold probability), the entire set of items included within the range of the AP may be presented. In yet another embodiment, all items in the store may be presented or the software application may ask which of the above embodiments the user prefers. The "next item" button 642 may present the user with the matched item with the next highest probability. Alternatively, the "next item" button 642 may present the user with the matched item of a second item detected in the picture taken by the consumer. For example, the picture taken by the consumer may include multiple items and selecting the "next item" button 642 may present the matched item having the highest probability of being the second item in the picture. The "delete" button 643 may delete the picture and matched items from the virtual shopping cart.

Figure 7:
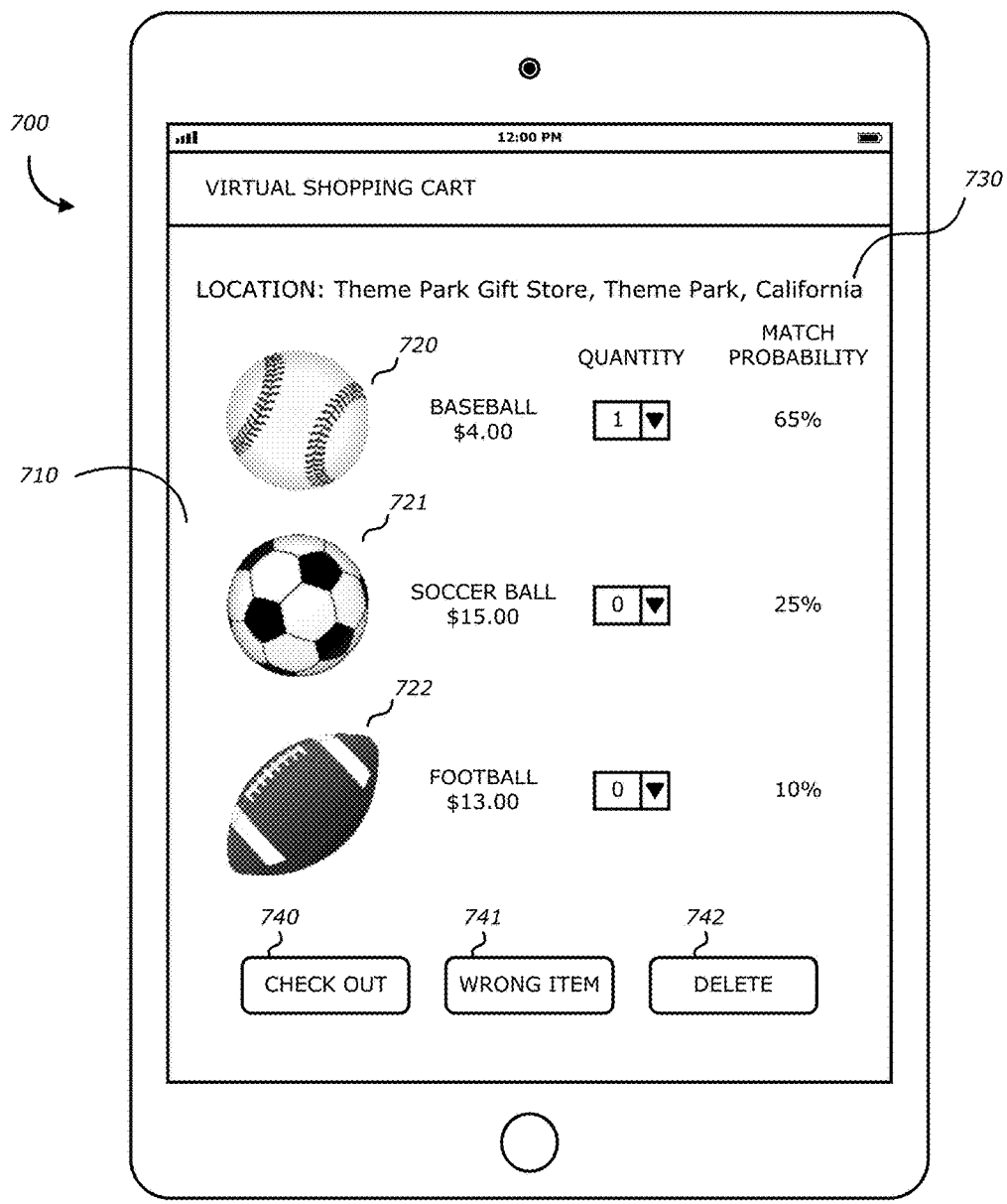
FIG. 7 is a second exemplary illustration of a network device adapted to present a virtual shopping cart to a user.

Referring to FIG. 7, a second exemplary illustration of a network device adapted to present a virtual shopping cart to a user is shown. The network device 700 includes a screen 710 that is seen displaying a virtual shopping cart to a user. The virtual shopping cart of FIG. 7 includes three matched items (the matched items 720, 721 and 722), the location information 730, the "check out" button 740, the "wrong item" button 741 and the "delete" button 742. In this embodiment, the three matched items are organized by "match probability" with the matched item having the highest probability of being the item intended by the user. A "quantity" option is also presented adjacent to each matched item allowing the user the ability to select a quantity of one or more of the matched items presented to purchase. The location information 732 is the same as was discussed in accordance with FIG. 6.

The "check out" button 740 allows a user to continue the purchasing process with the one or more matched items presented based on the user's selection of a quantity for each item. In one embodiment, the item having the highest match probability will automatically be displayed having a quantity of one selected while the other matched items having a lower match probability will automatically be displayed having a quantity of zero selected. The "wrong item" button 741 and the "delete" button 742 are the same as was discussed in accordance with FIG. 6.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more devices, causes performance of operations comprising:
   obtaining a first image, of a particular product, taken by a device operated by a user;
   identifying a first physical location of the device when the image was taken by the device;
   identifying a subset location of the device based on location data associated with the first image, wherein the subset location is within the first physical location;
   based on the subset location and map information of the first physical location, filtering a set of images corresponding to a plurality of products to obtain a first subset of images that are stored in association with the first physical location;
   comparing the first image to the first subset of images to identify a product, from the plurality of products, that matches the particular product.

2. The medium of claim 1, wherein the plurality of products corresponds to a plurality of products-for-sale and wherein the first physical location comprises a location of a store that sells a subset of products corresponding to the subset of images stored in association with the first physical location.

3. The medium of claim 1, wherein the plurality of products corresponds to a plurality of products-for-sale and wherein the subset physical location comprises a location within a store for selling a subset of products corresponding to the subset of images stored in association with the first physical location.

4. The medium of claim 1, wherein the first physical location of the device, when the image was taken, is identified by the device.

5. The medium of claim 1, wherein the operations further comprise adding the product, from the plurality of products, to a virtual shopping cart.

6. The medium of claim 5, wherein the identified product, from the plurality of products, is added to the virtual shopping cart automatically in response to the device taking the image of the particular product.

7. The medium of claim 1, wherein the operations further comprise:
   obtaining a second image, of two or more products, taken by the device operated by the user;
   identifying a second physical location of the device when the second image was taken by the device;
   based on the second physical location, filtering the set of images corresponding to the plurality of products to obtain a second subset of images are stored in association with the second physical location;
   comparing the second image to the second subset of images to identify a subset of products, from the plurality of products, that matches the two or more products.

8. The medium of claim 7, wherein the operations further comprise adding the identified subset of products to a virtual shopping cart.

9. The medium of claim 1, wherein the operations further comprise:
   obtaining a second image, of two or more products, taken by the device operated by the user;
   cropping the second image to obtain a third image that includes a first product of the two or more products that is located near a center of the second image;
   identifying a second physical location of the device when the second image was taken by the device;
   based on the second physical location, filtering the set of images corresponding to the plurality of products to obtain a second subset of images are stored in association with the second physical location;
   comparing the third image to the first subset of images to identify a product, from the plurality of products, that matches the first product.

10. The medium of claim 1, wherein the operations further comprise:
    obtaining a second image, of two or more products, taken by the device operated by the user;
    obtaining user input selecting a first product of the two or more products;
    cropping the second image to obtain a third image that corresponds to the first product selected by the user;
    identifying a second physical location of the device when the second image was taken by the device;
    based on the second physical location, filtering the set of images corresponding to the plurality of products to obtain a second subset of images are stored in association with the second physical location;
    comparing the third image to the first subset of images to identify a product, from the plurality of products, that matches the first product.

11. The medium of claim 1, wherein the operations further comprise:
    obtaining a second image, of two or more products, taken by the device operated by the user;
    selecting a first product of the two or more products based on merchant defined factors;
    cropping the second image to obtain a third image that corresponds to the first product;
    identifying a second physical location of the device when the second image was taken by the device;
    based on the second physical location, filtering the set of images corresponding to the plurality of products to obtain a second subset of images are stored in association with the second physical location;
    comparing the third image to the first subset of images to identify a product, from the plurality of products, that matches the first product.

12. The medium of claim 1, wherein each physical location in a plurality of physical locations is stored in association with a corresponding subset of images associated with products sold at that physical location.

13. The medium of claim 1, wherein the first physical location is identified by extracting the first physical location from the data associated with the first image.

14. A system comprising:
    at least one device including a hardware processor;
    the system being configured to perform operations comprising:
    obtaining a first image, of a particular product, taken by a device operated by a user;

identifying a first physical location of the device when the image was taken by the device;

identifying a subset location of the device when the image was taken by the device based on, wherein the subset location is within the first physical location;

based on the subset location and a planogram associated with the first physical location, filtering a set of images corresponding to a plurality of products to obtain a first subset of images that are stored in association with the first physical location;

comparing the first image to the first subset of images to identify a product, from the plurality of products, that matches the particular product.

15. The system of claim 14, wherein the plurality of products corresponds to a plurality of products-for-sale and wherein the first physical location comprises a location of a store that sells a subset of products corresponding to the subset of images stored in association with the first physical location.

16. The system of claim 14, wherein the plurality of products corresponds to a plurality of products-for-sale and wherein the subset location comprises a location within a store for selling a subset of products corresponding to the subset of images stored in association with the first physical location.

17. The system of claim 14, wherein the operations further comprise adding the product, from the plurality of products, to a virtual shopping cart.

18. The system of claim 17, wherein the identified product, from the plurality of products, is added to the virtual shopping cart automatically in response to the device taking the image of the particular product.

19. The system of claim 14, wherein the operations further comprise:

obtaining a second image, of two or more products, taken by the device operated by the user;

identifying a second physical location of the device when the second image was taken by the device;

based on the second physical location, filtering the set of images corresponding to the plurality of products to obtain a second subset of images are stored in association with the second physical location;

comparing the second image to the second subset of images to identify a subset of products, from the plurality of products, that matches the two or more products.

20. A non-transitory computer readable medium comprising instructions that, when executed by one or more devices, causes the one or more devices to:

receive a first image taken by a device, wherein the first image is of a particular object and is associated with location data;

determine a first general area of the device when the first image was taken based on the location data;

determine a second general area of the device when the first image was taken based on a defined range and the location data, wherein the second general area is within the first general area;

based on the second general area and a planogram associated with the first general area, filter a set of images corresponding to a plurality of objects to obtain a subset of images that are stored in association with the second general area; and compare the first image to the subset of images to identify an object from the plurality of objects that matches the particular object.

* * * * *